(No Model.)

H. A. BRINTON.
COMPOUND LOCKING DEVICE.

No. 490,098. Patented Jan. 17, 1893.

WITNESSES:
H. M. Plaisted.
F. B. Ernest

INVENTOR
Henry A. Brinton
BY H. A. Toulmin,
his ATTORNEY.

UNITED STATES PATENT OFFICE.

HENRY A. BRINTON, OF HARRISBURG, PENNSYLVANIA.

COMPOUND LOCKING DEVICE.

SPECIFICATION forming part of Letters Patent No. 490,098, dated January 17, 1893.

Application filed June 16, 1892. Serial No. 436,961. (No model.)

*To all whom it may concern:*

Be it known that I, HENRY A. BRINTON, a citizen of the United States, residing at Harrisburg, in the county of Dauphin and State of Pennsylvania, have invented certain new and useful Improvements in Compound Locking Devices, of which the following is a specification, reference being had therein to the accompanying drawings.

My invention relates to certain new and useful improvements in compound locking devices adapted for hammer handles, or other places where it is desired to maintain a wedge or key in a locking or fastening position.

My improvements have reference to a plate of comparatively small thickness combined with a wedge or key engaged by said plate, while the plate engages with the member keyed or locked by my device; have reference to barbs or projections engaging with said wedge on one side and with said member on the other side; and have reference to peculiar forms and arrangements of said barbs or projections and to other points of detail hereinafter described and claimed.

Figure 1:
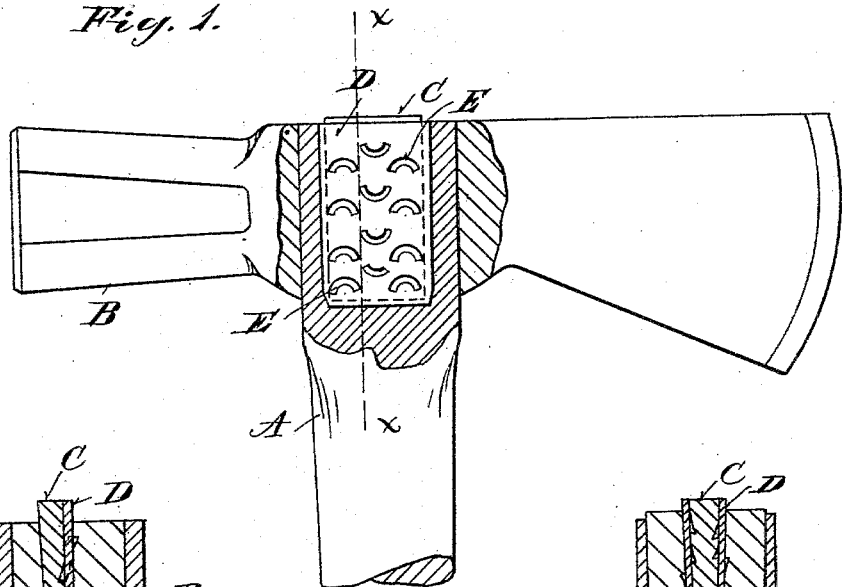
Figures 2, 3, 4, 5:
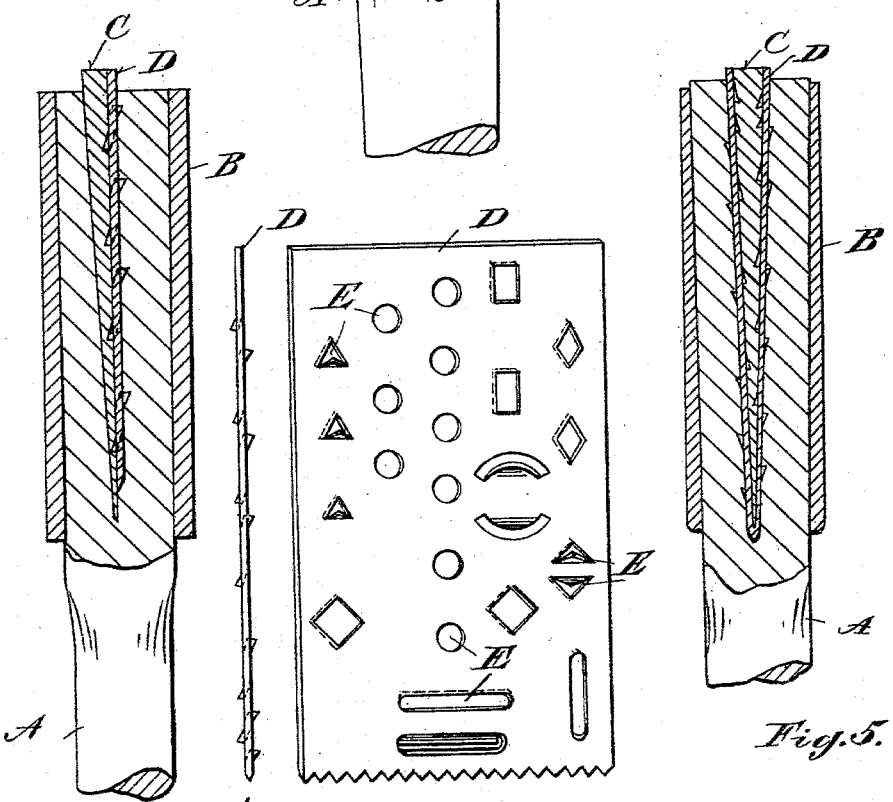

In the accompanying drawings on which like reference letters indicate corresponding parts: Figure 1, represents a handle partially in section, and a side view of a locking plate whereby it is secured in the head of a hatchet; Fig. 2, a section on the line x x of Fig. 1; Fig. 3, a detail perspective view of a locking plate; Fig. 4, an edge view of the same; and Fig. 5, a similar view to Fig. 2 showing a double plate and interposed wedge.

It is often found when inserting a wedge into a handle, or other place desired to be keyed or locked, that the pressure of the parts or members inclosing the wedge or key will force the same from its locking position unless it be pinned or otherwise secured for safety. My device is particularly adapted for overcoming such difficulty, and providing means whereby the wedge or key will be locked in its driven position without any danger of its loosening, or slipping out, under pressure of the parts or otherwise. I have illustrated it in a simple form and arrangement, of my device, it being understood that it may be applied to other uses than that of locking hammer handles with which it is herewith shown.

Referring to the drawings, the letter A designates a handle for a head B of a hatchet, into which it is locked by means of my compound locking device consisting of a wedge C and a plate D, the latter being preferably in sheet form and provided with perforations E of any desired form but preferably having barbs or shoulders on opposite sides thereof, the said shoulders or barbs being directed opposite to each other as shown in Figs. 2, 4 and 5. These barbs or shoulders thus present little hinderance to driving in one direction while those on the other side strongly oppose such action. On this latter side, the left as shown in the figures, is locked the wedge C and the barbs, pointing in the direction the wedge is to be driven, oppose any tendency of the wedge to slip or be forced out by the pressure of the adjacent parts. On the other, or outer side of the plate, the barbs or shoulders are directed backward and thus hold the plate and wedge engaged therewith, in their driven position. In other words, the plate forms a safety connection between the wedge and the member inclosing it. The plate is driven in it at the same time with the wedge and the barbs or shoulders, on both sides of the plate, are simultaneously engaged with the wedge and handle.

When the wood or material into which the wedge is driven, is of spongy or springy nature the barbs or shoulders in the plate may be simply in the form of perforations in the plate into which the spongy or springy portions of the inclosing member will insert themselves, and maintain the engagement of the plate and wedge without the additional help of projecting barbs. I claim therefore this plate with or without the barbs forming the shoulders, as the said shoulders may be formed by perforations or shoulders not projecting from the surface or sides of the plate.

I have therefore in Fig. 3, illustrated a variety of perforations, triangular, square, round, elongated &c., any or all of which may be used in the construction of this device. It is the advantage of my improvements that the wedge is not required to be of special construction, and that the interposed piece or plate is readily inserted along with the wedge or key. This plate may also be formed in duplicate, as shown in Fig. 5, the wedge being inclosed by the plate and the latter engaging with both sides of the opening of the gripping member. The plate may be serrated, sharpened or otherwise adapted for its entrance along with the wedge, the latter supporting the plate and giving it the necessary stiffness to withstand the driving action. In the form shown in Fig. 5, the plate may be inserted in the opening, the wedge driven to its locking position; or the plate and wedge may both be inserted at one and the same time as previously described.

I do not limit myself to any particular form of construction, or arrangement, but have herein fully illustrated and described my device in a convenient and well known construction to exemplify the advantage thereof.

Having thus fully described my invention what I claim as new and desire to secure by Letters Patent is:

1. In a compound locking device, the combination with a locked member, of a wedge or key therefor, and a plate having oppositely directed barbs on opposite sides thereof, one set of barbs engaging with the wedge, and the other set with the locked member, to oppose the withdrawal of the wedge and plate.

2. In a compound locking device, the combination with a locked member, of a wedge or key adapted to be inserted therein, and a double plate inclosing said wedge or key and having oppositely directed barbs or projections adapted to engage with the said member on the outside and with the inclosed wedge or key on the inside of the plate.

In testimony whereof I affix my signature in presence of two witnesses.

HENRY A. BRINTON.

Witnesses:
 JAMES B. BAILEY,
 CHAS. B. SPROUT.